(12) United States Patent
Ramirez et al.

(10) Patent No.: US 8,581,927 B2
(45) Date of Patent: Nov. 12, 2013

(54) MULTIDIMENSIONAL PARTICLE ANALYSIS DATA CLUSTER RECONSTRUCTION

(75) Inventors: Carlos A. Ramirez, Miami, FL (US); Jaesang Park, Miami, FL (US); Jiuliu Lu, Homestead, FL (US)

(73) Assignee: Beckman Coulter, Inc.

( * ) Notice: Subject to any disclaimer, the term of this patent is extended or adjusted under 35 U.S.C. 154(b) by 744 days.

(21) Appl. No.: 12/608,777

(22) Filed: Oct. 29, 2009

(65) Prior Publication Data

US 2010/0110103 A1 May 6, 2010

Related U.S. Application Data

(60) Provisional application No. 61/111,057, filed on Nov. 4, 2008.

(51) Int. Cl.
*G09G 5/00* (2006.01)
*G01N 33/48* (2006.01)

(52) U.S. Cl.
USPC .............................................. 345/619; 702/21

(58) Field of Classification Search
USPC ....................................... 702/26, 21; 708/814
See application file for complete search history.

(56) References Cited

U.S. PATENT DOCUMENTS

| | | | |
|---|---|---|---|
| 5,329,461 A | 7/1994 | Allen et al. | |
| 6,014,904 A * | 1/2000 | Lock | 73/865.5 |
| 6,850,876 B1 * | 2/2005 | Lam et al. | 703/11 |
| 6,944,338 B2 * | 9/2005 | Lock et al. | 382/168 |
| 8,116,574 B2 * | 2/2012 | Engels et al. | 382/224 |

| | | | |
|---|---|---|---|
| 2002/0029235 A1 * | 3/2002 | Lock et al. | 708/814 |
| 2005/0089923 A9 * | 4/2005 | Levinson et al. | 435/7.1 |
| 2006/0184461 A1 * | 8/2006 | Mori | 706/13 |

FOREIGN PATENT DOCUMENTS

WO WO2006089190 8/2006

OTHER PUBLICATIONS

John Lakoumentas et al, The Probabilities Mixture Module for Clustering Flow-Cytometric Data . . . Jan. 1, 2006, Biological and Medical Data Analysis Lecture Notes in Computer Science, LNCS, Springer, Berlin, DE, pp. 150-160, XP019052691.
Boddy L et al, Pattern Recognition in Flow Cytometry, Cytometry, Alan Liss, New York, US, vol. 44, No. 3, Jul. 1, 2001, pp. 195-209, XP002361463.
Zeng et al, Feature-guided clustering of multi-dimensional flow cytometry datasets, Journal of Biomedical Informatics, Academic Press, New York, NY, US, vol. 40, No. 3, May 13, 2007, pp. 325-331, XP022077858.
Derek Davies: Chapter 11: Cell Sorting by Flow Cytometry, In:Marion G. Macey: Flow Cytometry Principles and Application, Jan. 1, 2007, Humana, XP002662473, pp. 257-276.

(Continued)

*Primary Examiner* — Edward Martello
(74) *Attorney, Agent, or Firm* — K&L Gates LLP; Louis C. Cullman; Andrew L. Reibman

(57) ABSTRACT

Systems and methods for multidimensional particle analysis data cluster mapping and reconstruction are provided. In one embodiment, a method for reconstructing multidimensional particle analysis data clusters is provided. The method includes obtaining a set of segmented two-dimensional projections corresponding to multidimensional particle analysis data associated with a biological sample of particles. Each segmented two-dimensional projection has two-dimensional clusters associated with particle populations in the biological sample. The method also includes reconstructing one or more multidimensional clusters based on the two-dimensional clusters in the segmented two-dimensional projections.

30 Claims, 10 Drawing Sheets

(56) References Cited

OTHER PUBLICATIONS

Jinwook Seo and Ben Shneiderman ED-ED by Jae K. Lee, Chapter 7—Multidimensional Analysis and Visualization on Large Biomedical Data, Jan. 1, 2010, Statistical Bioinformatics: A Guide for Life and Biomedical Science Researchers, Wiley-Blackwell, Hoboken, NJ, USA, pp. 157-184, XP008143919.

Sergios Theodoridis and Konstantinos Koutrombas, Pattern Recognition 4th ed, Jan. 1, 2009, Academic Press, XP002662199, pp. 821-862.

Graham Leslie, Flow Cytometry A Basic Guide, Jul. 1, 2006, XP002662474, www.dasc.dk/Pdf_files/FCBasic%20.pdf.

Shuette W H et al, Count-Dependent Filter for Smoothing Bivariate FCM Histograms, Cytometry, Alan Liss, New York, US, vol. 7, No. 3, Jan. 1, 1986, pp. 274-280, XP009015024, ISSN:0196-4763, DOI: 10.1002/CYTO.990070308.

* cited by examiner

FEATURES
104
| | $f_1$ | $f_2$ | ... | $f_d$ |
|---|---|---|---|---|
| P1 | 1 | 2 | ... | 3 |
| P2 | 1 | 3 | ... | 2 |
| ... | ... | ... | ... | ... |
| Pr | 2 | 1 | ... | 3 |
102 DATA POINTS
FIG. 1A
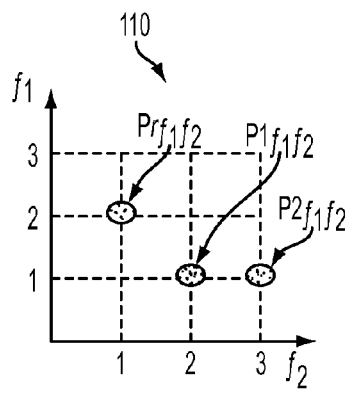
FIG. 1B
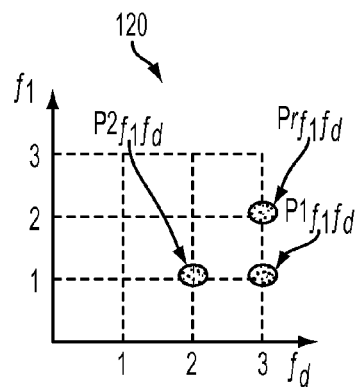
FIG. 1C
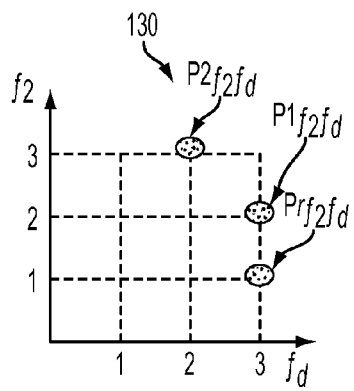
FIG. 1D

MULTIDIMENSIONAL PARTICLE ANALYSIS DATA CLUSTER RECONSTRUCTION

CROSS-REFERENCE TO RELATED APPLICATIONS

The present application claims the benefit of U.S. Provisional Application No. 61/111,057, filed Nov. 4, 2008, which is incorporated by reference herein in its entirety.

FIELD OF THE INVENTION

Embodiments of the present invention generally relate to systems and methods of particle analysis. More specifically, embodiments relate to systems and methods for processing and displaying cellular analysis data.

BACKGROUND

Particle analyzers, such as, flow cytometers and hematology analyzers, measure physical properties of particles in a biological sample. Exemplary hematology analyzers are available from a number of companies including Beckman Coulter Inc., Sysmex Corp., Abbott Laboratories Inc., Siemens AG, and Shenzhen Mindray Bio-Medical Electronics Co., Ltd. Exemplary flow cytometers are available from a number of companies including Beckman Coulter Inc. and Becton, Dickinson and Company. Exemplary physical property measurements performed by particle analyzers include electro-optical measurements.

Measurements of different physical properties of particles are stored as particle analysis data. Each measured physical property corresponds to a feature (or parameter) in the particle analysis data. In this way, when multiple features are involved, the particle analysis data can form a multidimensional feature space. Each feature is associated with a dimension of the multidimensional feature space. Data points in the multidimensional feature space correspond to the particles. In particular, the measured physical property values of a particle can serve as coordinates of the corresponding data point in a multidimensional feature space.

Particles in a biological particle population usually share similar physical properties. Accordingly, data points corresponding to particles in the same population often group into clusters in the multidimensional feature space. Clusters in a multidimensional feature space are multidimensional clusters. For example, clusters in a three-dimensional (3D) feature space are 3D clusters. Classifying particle clusters can help users analyze the biological sample. Problems are encountered, however, when classifying particle clusters in a multidimensional feature space. Classifying particle clusters directly based on population types can be difficult in the multidimensional feature space due to the complex statistical distribution of the particles and the number of dimensions involved.

Particle populations can also be classified in two-dimensional (2D) projections of the multidimensional feature space. A 2D projection can be obtained by selecting data measuring two features from the multidimensional feature space. 2D clusters in the 2D projection can then be associated with particle populations. However, because a 2D projection does not contain data that measures features other than the two selected features, it can cause inaccurate results in particle population classification. For example, some particle populations can have similar values in two features but different values in other features. In a 2D projection over the two features, particles in these populations can overlap. A population classification based on that 2D projection alone would be inaccurate.

Because each 2D projection only contains data associated with two features, it is possible that each 2D projection becomes an isolated source of information. Global information such as cross-relations can be lost. Cross-relations include relationships among 2D clusters in the 2D projections. Sometimes a particle population can be projected to different locations and shapes in different 2D projections. Without cross-relations, it is difficult to identify such 2D clusters as corresponding to the same particle populations.

The classification of data points into particular particle populations based on 2D projections can be even less accurate for abnormal biological samples. Particle populations in abnormal samples are often shifted from their expected locations. This can cause heavy particle overlapping in 2D projections making it even more difficult to classify the overlapped particles into different populations.

BRIEF SUMMARY OF THE INVENTION

Embodiments of the present invention provide systems and methods for reconstructing multidimensional clusters of particle analysis data.

In one embodiment, a method for reconstructing multidimensional particle analysis data clusters on a computing device is provided. The method includes obtaining on a computing device a set of segmented two-dimensional projections corresponding to multidimensional particle analysis data associated with a biological sample of particles. Each segmented two-dimensional projection has one or more two-dimensional clusters associated with particle populations in the biological sample. The method also includes reconstructing on the computing device one or more multidimensional clusters based on the two-dimensional clusters in the segmented two-dimensional projections.

In another embodiment, a computer-implemented system for reconstructing multidimensional particle analysis data clusters is provided. The computer-implemented system includes a two-dimensional segmentation module, a two-dimensional cluster classification module, and a multidimensional cluster reconstruction module. The two-dimensional segmentation module obtains two-dimensional projections of multidimensional particle analysis data associated with a biological sample of particles and segments the two-dimensional projections into one or more two-dimensional clusters. Each of the two-dimensional clusters corresponds to a particle population in the biological sample.

The two-dimensional cluster classification module identifies, for each multidimensional data point in the multidimensional particle analysis data that has a value above a pre-specified threshold, two-dimensional clusters in the two-dimensional projections that contain the multidimensional data point. The multidimensional cluster reconstruction module operates to group multidimensional data points based on the identified two-dimensional clusters, thereby reconstructing one or more multidimensional clusters.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIGS. 1A-D show an example of multidimensional particle analysis data and corresponding 2D projections.

The present invention is described with reference to the accompanying drawings. The drawing in which an element first appears is typically indicated by the leftmost digit in the corresponding reference number.

DETAILED DESCRIPTION OF EMBODIMENTS OF THE INVENTION

Figure 2:
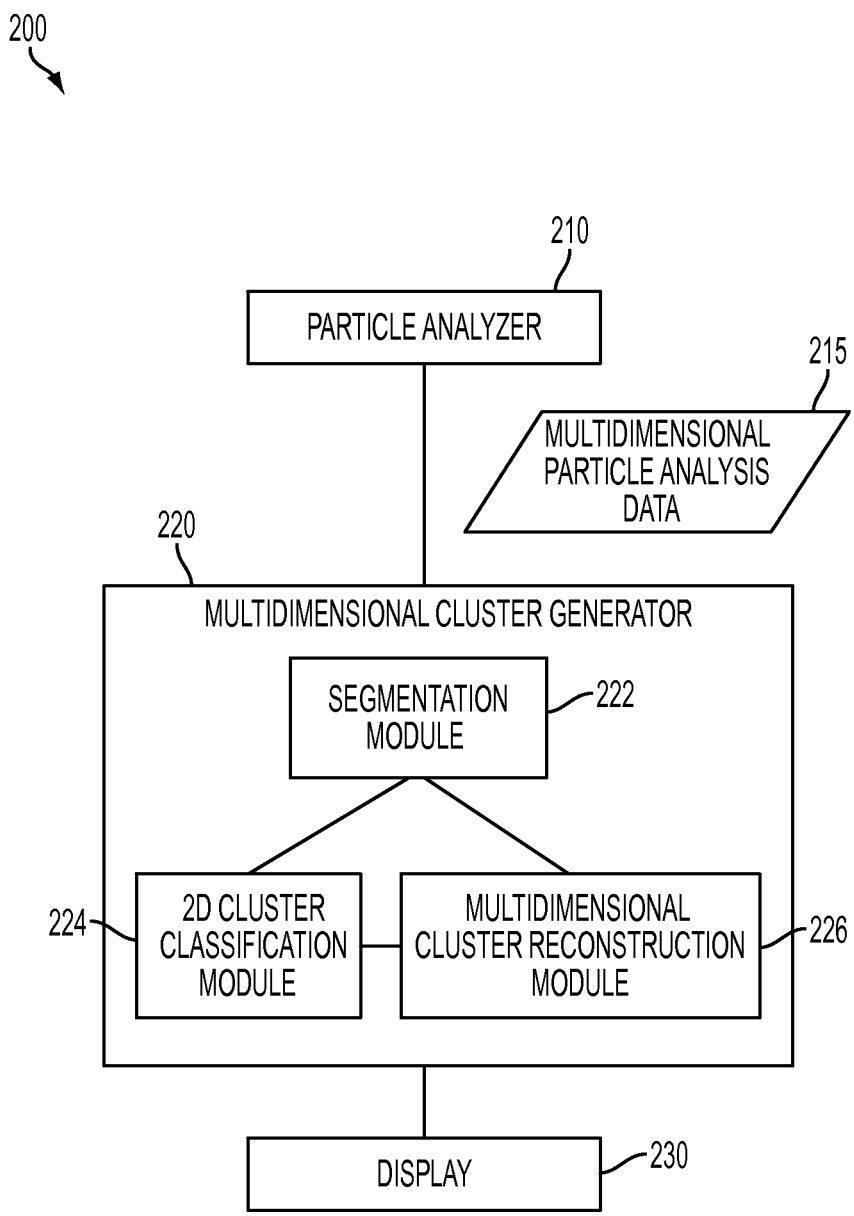
FIG. 2 is a diagram of an exemplary system for reconstructing multidimensional clusters of hematology data according to an embodiment of the present invention.

Embodiments of the present invention are described with respect to biological particle analyzers. Embodiments of the present invention involve mapping multidimensional cross-relation information and reconstructing multidimensional clusters from two-dimensional (2D) projections of a multidimensional feature space. Each 2D projection is associated with particle analysis data in two dimensions. The mapping and reconstructing are based on cross-relation information gathered from 2D clusters detected in the 2D projections. The cross-relation information of clusters in different 2D projections are extremely useful when the clusters are overlapped or shifted, because overlapped or shifted clusters in one 2D projection can appear separated or well located in another 2D projection. In this way, a display of reconstructed multidimensional clusters (such as, reconstructed 3D clusters) can still show and recover data points in clusters that would otherwise not be shown in cluster images alone due to blockage or overlap of different 2D projections.

Further, embodiments of the present invention can identify cross-relations of the 2D clusters in different 2D projections. Based on the cross-relations, the multidimensional clusters can be reconstructed in the multidimensional feature space. Such reconstruction is computationally less intensive than classifying the multidimensional clusters in multidimensional feature space directly. It can also be used for more accurate population classification for abnormal samples. The cross-relations can help recover populations not detected in some of the 2D projections in the multidimensional cluster reconstruction process.

FIGS. 1A-D show an example of multidimensional particle analysis data and corresponding 2D projections. In FIG. 1A, points P1, P2, and Pr are multidimensional data points in a set of data points 102, where r can be a number equal to or greater than 3. Points P1, P2, and Pr have coordinate values corresponding to d features, f1, f2, ..., fd in a set of features 104, where d is the number of distinct features. For example, features 104 can include light scatter, volume, opacity, axial light loss, etc. FIG. 1B shows a corresponding 2D projection 110 over features f1 and f2. In FIG. 1B, points $P1_{f_1f_2}$, $P2_{f_1f_2}$, and $Pr_{f_1f_2}$ are respective 2D projections of points P1, P2, and Pr in projection 110. FIG. 1C shows a projection 120 over features f1 and fd. Points $P1_{f_1f_d}$, $P2_{f_1f_d}$, and $Pr_{f_1f_d}$ are 2D projections of points P1, P2, and Pr in projection 120. FIG. 1D shows a 2D projection 130 over features f2 and fd. Points $P1_{f_2f_d}$, $P2_{f_2f_d}$, and $Pr_{f_2f_d}$ are respective 2D projections of points P1, P2, and Pr in projection 130.

In one embodiment, the 2D projections are 2D scattergrams obtained from multidimensional particle analysis data. Each 2D data point in a 2D scattergram corresponds to a particle event. In another embodiment, the 2D projections are 2D histograms obtained from the multidimensional particle analysis data. Each 2D data point in a 2D histogram corresponds to a two-dimensional bin. Each bin accumulates particle events appearing at the location of the bin. The accumulated value represents the particle density or count at the location. For instance, this count can be a count of the number of particles having data values that correspond to the bin location (that is, the values of the 2D features represented at the particular bin).

System Overview

FIG. 2 is a diagram of an exemplary system 200 for multidimensional particle analysis data cluster reconstruction according to one embodiment of the present invention.

System 200 includes a particle analyzer 210 and a multidimensional cluster generator 220. System 200 can also include a display 230.

Figure 3:
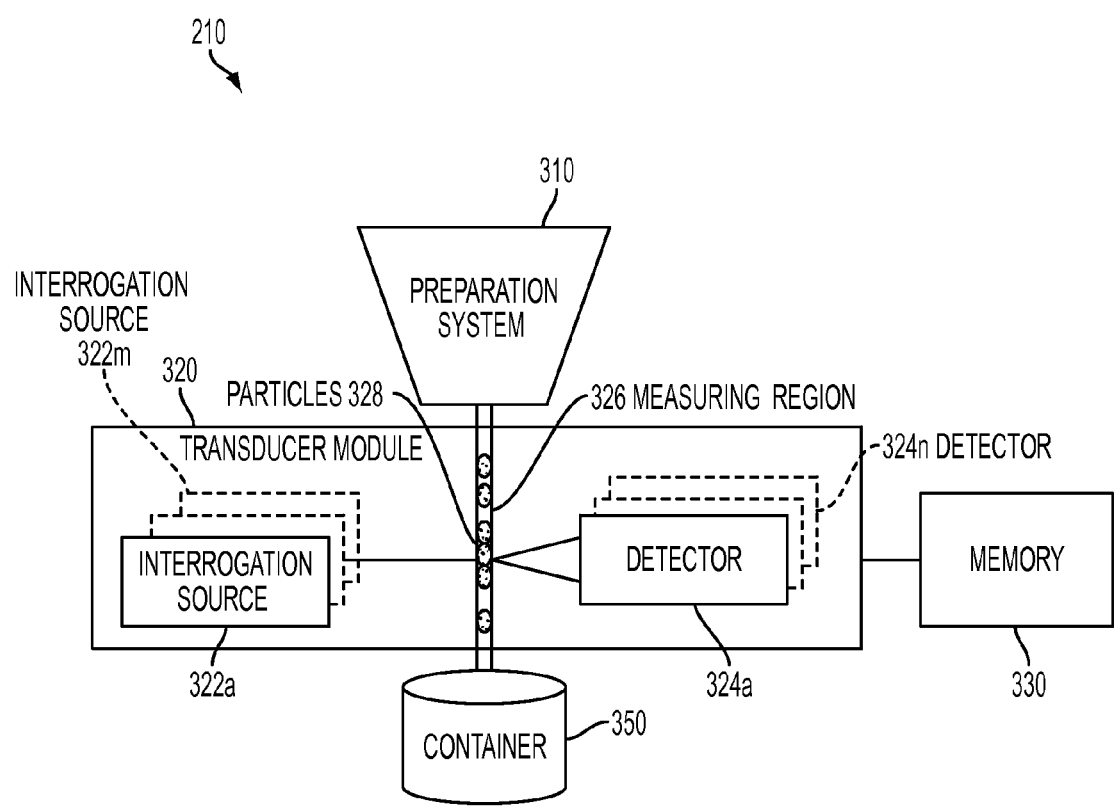
FIG. 3 is a diagram of an exemplary particle analyzer for providing particle analysis data according to an embodiment of the present invention.

Particle analyzer 210 provides multidimensional particle analysis data 215 captured from a biological sample of particles. FIG. 3 is a schematic diagram of particle analyzer 210 according to an embodiment of the present invention. Particle analyzer 210 includes a preparation system 310, a transducer module 320, a measuring region 326, a memory 330, and a container 350.

Preparation system 310 prepares biological samples containing particles for analysis. In one embodiment, the particles are blood cells. In alternative embodiments, the particles can be other types of biological particles such as DNA fragments.

Transducer module 320 captures data corresponding to the analyzed particles. In one embodiment, transducer module 320 includes multiple interrogation sources 322a-m, multiple detectors 324a-n, and a measuring region 326. Preparation system 310 passes the prepared biological particles 328 from a biological sample through measuring region 326.

Interrogation sources 322a-m provide electro-optical interrogations of particles 328 so that one or more parameters associated with the interrogated particles can be detected by detectors 324a-n respectively. In one embodiment, for example, interrogation sources 322a-m include one or more lasers and/or electrical sources (e.g. a direct current (DC)

source). In alternative embodiments, other types and/or numbers of interrogation sources can be used. Detectors 324a-n detect parameters associated with the interrogated particles in the samples. Detectors 324a-n then send the detected parameters as data to memory 330. In one embodiment, detectors 324a-n include one or more photodiode sensors. Detectors 324a-n can also include a DC receiver. In alternative embodiments, other types of detectors can be used depending upon the particular type of interrogation to be done.

In one embodiment, the parameters are derived from electro-optical measurements, which include DC (direct current), RF (radio frequency), light scatter (at one or more angles), fluorescence, side scatter light, and axial light loss as is well-known in the art, and described for example in U.S. Pat. No. 5,125,737 which is hereby incorporated by reference in its entirety. These examples of parameters are illustrative and not intended to limit the present invention. Different combinations of parameters and types of parameters can be used.

In one embodiment, particle analyzer 210 measures biological particles contained in a flowing stream. In another embodiment, particle analyzer 210 measures the biological particles in a microtiter plate. Particle analyzer 210 can be other type of analyzers that can provide particle analysis data in a multidimensional feature space.

Multidimensional cluster generator 220 reconstructs multidimensional clusters based on multidimensional particle analysis data 215 provided by particle analyzer 210. For instance, multidimensional particle analysis data 215 can be output from memory 330. Multidimensional cluster generator 220 includes a segmentation module 222, a 2D cluster classification module 224, and a multidimensional cluster reconstruction module 226.

Segmentation module 222 segments 2D projections of multidimensional particle analysis data 215. Each 2D projection is segmented into clusters. Each cluster can correspond to one or more particle populations in the biological sample. Each segmented 2D projection forms a 2D cluster image. In an alternative embodiment, multidimensional cluster generator 220 does not include segmentation module 222, but receive segmented 2D projections directly from particle analyzer 210.

2D cluster classification module 224 identifies cross-relations among the 2D clusters in the 2D cluster images. Such cross-relations can identify 2D clusters containing 2D points corresponding to same particle populations. Such cross-relations and the identifications of 2D clusters as carried out by 2D cluster classification module 224 are described further below.

Multidimensional cluster reconstruction module 226 reconstructs multidimensional clusters based on the 2D cluster cross-relations. Such representation of multidimensional clusters as carried out by multidimensional cluster reconstruction module 226 is described further below.

In one embodiment, multidimensional cluster generator 220 and its components 222-226 can be implemented in software, firmware, hardware or any combination thereof in a computing device. Example computing devices, include, but are not limited to, a computer, workstation, distributed computing system, embedded system, stand-alone electronic device, networked device, rack server, a device having at least one processor and memory, or other type of computer system.

In one embodiment, the reconstructed multidimensional clusters are displayed on display 230. Display 230 can be any type of display that can be coupled with multidimensional cluster generator 220. For example, display 230 can be a printer, a CRT monitor, an LCD display, a touchscreen display, etc. These examples are illustrative and not intended to limit the present invention.

In another embodiment, the reconstructed multidimensional cluster information is stored on a storage device (not shown) and can be examined later by users. In another embodiment, the particles in each cluster are counted for subsequent analysis of the biological sample.

2D Projections of Multidimensional Particle Analysis Data

To reconstruct multidimensional clusters according to one embodiment of the present invention, the particle analysis data is first projected onto pairs of dimensions in the multidimensional feature space. 2D projections of the multidimensional particle analysis data are formed accordingly. In one example, given a set F of d features $f_1, f_2, \ldots, f_d$ for r number of particles:

$$F=\{f_1, f_2, \ldots, f_d\}, \qquad (1)$$

where a feature $f_k$ include r measured values for the r particles, each particle associated with one value:

$$f_k=\{x_{f_k1}, x_{f_k2}, \ldots, x_{f_kh}, \ldots x_{f_kr}\}, k=1, \ldots, d, x_{f_kh} \in N \qquad (2)$$

where index h=1, . . . r and N represents natural numbers.

A 2D projection is obtained by projecting the data on a pair of features $\{f_m, f_n\}$ in feature set F, with $1 \leq m < n \leq d$. The total number t of different 2D projections that can be obtained by combining pairs of features in F is:

$$t = \frac{d!}{2(d-2)!} \qquad (3)$$

Figure 4A:
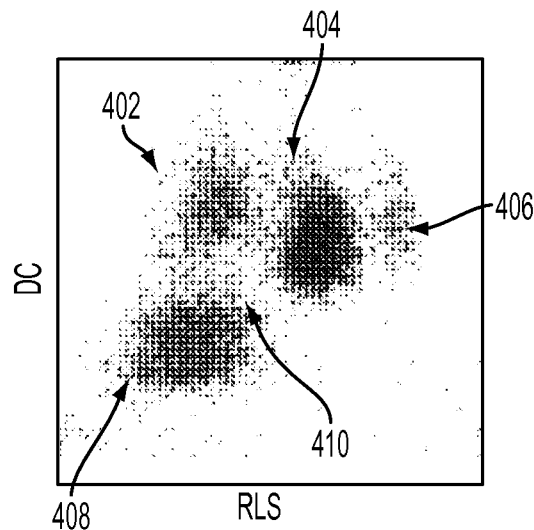
FIGS. 4A-B are two 2D histograms of hematology data for a white blood cell normal sample in two different 2D projections.
Figure 4B:
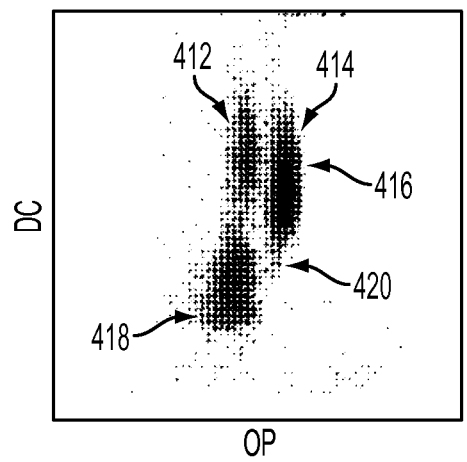

FIGS. 4A and 4B are examples of 2D histograms of hematology data for white blood cell subpopulations contained in a normal whole blood sample.

In FIG. 4A, the histogram is on DC (direct current)-RLS (rotated light scatter) dimensions. Data in the histogram group in clusters corresponding to different white blood cell populations, such as monocytes 402, neutrophils 404, eosinophils 406, lymphocytes 408, and basophils 410. FIG. 4B is a 2D histogram over DC-OP (opacity) dimensions. Opacity for example can be a feature that is a function of DC and radio frequency (RF). The clusters in FIG. 4B correspond to white blood cell populations, such as monocytes 412, neutrophils 414, eosinophils 416, lymphocytes 418, and basophils 420. Note that, in FIGS. 4A and 4B, clusters corresponding to the same white blood cell population have different locations and shapes.

One embodiment of the present invention identifies cross-relations of 2D clusters in 2D projections of multidimensional feature space. Based on the cross-relations, the multidimensional clusters can be reconstructed in the multidimensional feature space. Such reconstruction is computationally less intensive than classifying the multidimensional clusters in multidimensional feature space directly. It can also be used for more accurate population classification for abnormal samples. Particle populations in abnormal samples are often shifted from their expected locations. This can cause heavy particle overlapping in 2D projections making it difficult to classify the overlapped particles into different populations. The cross-relations can identify clusters in different 2D projections that correspond to same populations, thereby providing accurate population classification for abnormal sample. In addition, the cross-relations can help recover populations not detected in some of the 2D projections in the multidimensional cluster reconstruction process as shown in the Example section.

Cross-Relations of 2D Clusters in 2D Projections

In one embodiment, to reconstruct multidimensional clusters, 2D clusters in the 2D projections are identified. In one embodiment, each 2D projection is treated as a 2D image. Image segmentation techniques can be used to segment a 2D projection into regions. Each region corresponds to a 2D cluster. Various image segmentation techniques are available for the 2D clustering. In one embodiment, dual-grayscale reconstruction and Watershed transformation are used to classify the 2D clusters in the 2D projections for multidimensional cluster reconstruction.

Each 2D projection is first segmented into separate 2D clusters. The segmented 2D projection forms a 2D cluster image.

In one example, a set of 2D cluster images ψ corresponding to feature set F of equation (1) can be defined as:

$$\psi = \{I_{f_m f_n}\} \quad (4)$$

where $f_m$, $f_n$ are features in F with m<n, $$I_{f_m f_n} = \{C_{i, f_m f_n}\} \text{ with } i=1, \ldots, s_{f_m f_n} \quad (5)$$

is a cluster image including a total number of $s_{f_m f_n}$ clusters, where $C_{i, f_m f_n}$ is the $i^{th}$ cluster of cluster image $I_{f_m f_n}$. $C_{i, f_m f_n}$ is defined as:

$$C_{i, f_m f_n} = \{(x_{f_m}, x_{f_n}, i) : x_{f_m} \in f_m, x_{f_n} \in f_n\}, \quad (6)$$

where $x_{f_m}$ is a value in $f_m$ dimension and $x_{f_n}$ is a value in $f_n$ dimension. $C_{i, f_m f_n}$ collects the 2D points in $I_{f_m f_n}$ with label i. Label i can be a natural number temporarily assigned to the 2D cluster. No mapping between the 2D clusters and the particle populations are needed at this stage.

Figure 5:
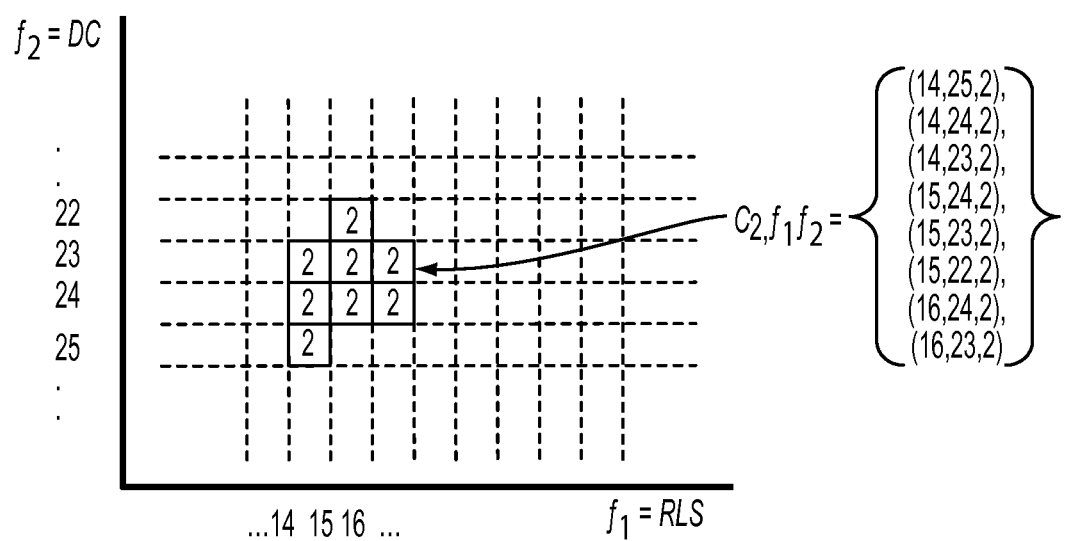
FIG. 5 is a definition of a 2D cluster according to an embodiment of the present invention.

FIG. 5 shows an example of the definition of a 2D cluster in a 2D cluster image $I_{f_1 f_2}$. In FIG. 5, 2D cluster $C_{2, f_1 f_2}$ is a cluster with label number "2" in cluster image $I_{f_1 f_2}$ and includes pixels at 2D coordinates (14,25), (14,24), (14,23), (15,24), (15,23), (15,22), (16,24), (16,23).

Equation (6) can be used to identify 2D points with an associated 2D cluster in each cluster image. Given a multidimensional data point, its 2D projection points in each cluster image can be obtained. Accordingly, the 2D clusters containing these 2D projection points can be identified. These identified 2D clusters have a cross-relation because they relate to the same multidimensional data point. These identified 2D clusters also form a 2D cluster classification for the multidimensional data point.

Multidimensional Cluster Reconstruction

Multidimensional clusters can be reconstructed based on the cross-relations among 2D clusters. The multidimensional points having a same 2D cluster classification (i.e. each of their 2D projections being included in the same corresponding 2D cluster) are grouped into a multidimensional cluster in the multidimensional feature space. The multidimensional clusters can be defined as:

$$\Psi = \{M_{q_1, q_2, \ldots, q_t, l}\}, \quad (7)$$

where $M_{q_1, q_2, \ldots, q_t, l}$ is a multidimensional cluster with label number l:

$$M_{q_1, q_2, \ldots, q_t, l} = \begin{cases} (x_{f_1}, x_{f_2}, \ldots, x_{f_d}, l) : & \forall (x_{f_1}, x_{f_2}) \in C_{q_1, f_1 f_2}, \\ & \forall (x_{f_1}, x_{f_3}) \in C_{q_2, f_1 f_3}, \\ & \vdots \\ & \forall (x_{f_m}, x_{f_n}) \in C_{q_k, f_m f_n}, \\ & \vdots \\ & \forall (x_{f_{d-1}}, x_{f_d}) \in C_{q_t, f_{d-1} f_d}, \\ & H(x_{f_1}, x_{f_2}, \ldots, x_{f_d}) > T \end{cases} \quad (8)$$

In equation (8), $C_{q_k, f_m f_n}$ is a cluster labeled as $q_k$ in 2D projection $\{f_m, f_n\}$, k=1, 2, …, t. t is the total number of 2D projections used to reconstruct $M_{q_1, q_2, \ldots, q_t, l}$. $H(x_{f_1}, x_{f_2}, \ldots, x_{f_d})$ is the multidimensional accumulated histogram value accumulated at data point $(x_{f_1}, x_{f_2}, \ldots, x_{f_d})$ in the multidimensional feature space F. The value of $H(x_{f_1}, x_{f_2}, \ldots, x_{f_d})$ represents the particle density or count at data point $(x_{f_1}, x_{f_2}, \ldots, x_{f_d})$. T is a pre-defined minimum number of particle events. T can be used as a noise filter to remove noise or less interesting data having a small density value. A set of multidimensional data points sharing the same label l forms multidimensional cluster $M_{q_1, q_2, \ldots, q_t, l}$ in the multidimensional feature space F.

According to one embodiment, for every multidimensional cluster $M_{q_1, q_2, \ldots, q_t, l}$ in Ψ, equation (8) defines a unique relationship for the 2D clusters indexed by $q_1, q_2 \ldots q_t$. Based on this relationship, 2D clusters in different 2D projections can be related. Once a 2D cluster $q_i$ (i=1, 2, …, t) is classified as belonging to a particle population in one 2D projection, the related 2D clusters $q_1, q_2 \ldots q_t$ other than $q_i$ can be immediately identified in all remaining 2D projections.

In some embodiments, according one feature, not all 2D projections are used to reconstruct the multidimensional cluster. For example, in one embodiment, the multidimensional data are data measuring three features $\{f_1, f_2, f_3\}$. The data forms a 3D feature space $f_1$–$f_2$–$f_3$. According to equation (3) with d=3, three 2D projections can be obtained, i.e. $f_1$–$f_2$, $f_1$–$f_3$, and $f_2$–$f_3$. Note that, the three features $\{f_1, f_2, f_3\}$ are covered by any two of these three 2D projections. Therefore, only two 2D projections are needed to reconstruct the multidimensional clusters.

Reconstructing Multidimensional Clusters Based on 2D Clusters

Figure 6:
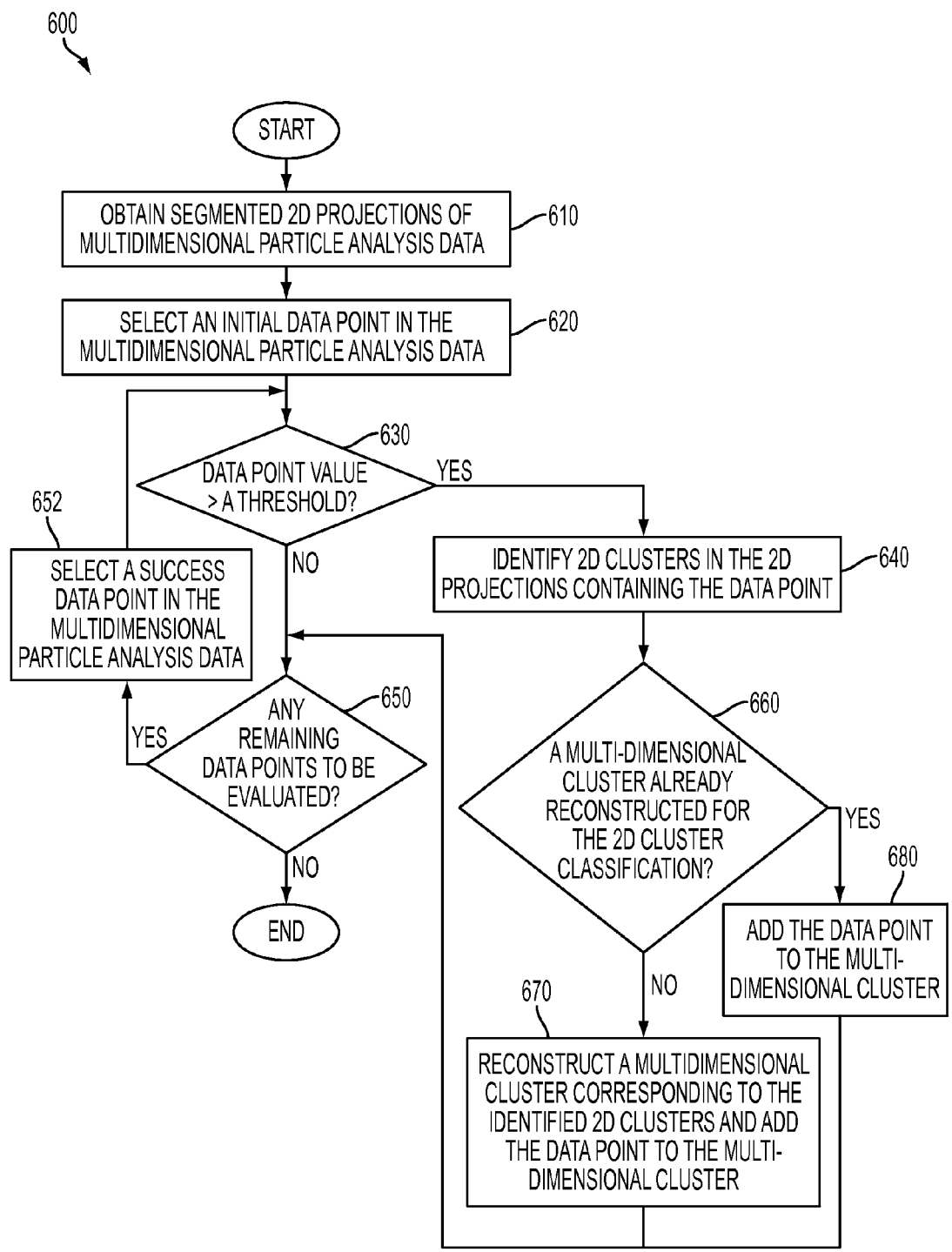
FIG. 6 is a flowchart of an exemplary procedure for reconstructing multidimensional clusters of particle analysis data according to an embodiment of the present invention.

FIG. 6 is a flowchart of an exemplary procedure 600 for reconstructing multidimensional clusters of multidimensional particle analysis data based on 2D clusters in the corresponding 2D projections (steps 610-680) according to an embodiment of the present invention. In one embodiment, multidimensional cluster generator 220 and its components 222-226 carry out the procedure 600. For brevity, procedure 600 is described with respect to multidimensional cluster generator 220, but is not necessarily limited to multidimensional cluster generator 220.

In step 610, multidimensional cluster generator 220 obtains a set of segmented 2D projections of a multidimensional feature space corresponding to multidimensional particle analysis data. Each segmented 2D projection forms a cluster image. The cluster images include 2D clusters. In one embodiment, the cluster images are provided by segmentation module 222. In an alternative embodiment, multidimensional cluster generator 220 does not include segmentation module 222 and receive already segmented 2D projections from another module such as particle analyzer 210. In some embodiments, not all of the cluster images are needed for reconstructing the multidimensional clusters and only those cluster images involved in a cross-relation are needed or used.

In step 620, an initial multidimensional data point is selected from multidimensional particle analysis data 215. In step 630, the value of the data point is compared with a threshold. In one embodiment, the value of the data point is a density value associated with the data point in a multidimensional histogram. The threshold is a value for filtering out noise or less interesting points in the particle analysis data. The threshold can be determined by a user or selected based on statistical analysis of particle analyzer performance. If the data point has a value below the threshold in step 630, procedure 600 proceeds to step 650.

If the value of the data point is above the threshold, control proceeds to step 640. 2D cluster classification module 224 identifies the 2D clusters containing the 2D projections of the data point in the corresponding cluster images. Such 2D clusters form a 2D cluster classification associated with the multidimensional data point. In step 660, multidimensional cluster reconstruction module 226 performs a check to determine whether there already exists a reconstructed multidimensional cluster containing data points having the same 2D cluster classification. If such a multidimensional cluster does not exist, in step 670, multidimensional cluster reconstruction module 226 reconstructs a multidimensional cluster and adds the data point into the reconstructed multidimensional cluster. If such a multidimensional cluster exists, in step 680, multidimensional cluster reconstruction module 226 adds the data point into the existing multidimensional cluster. Procedure 600 then proceeds to step 650, where a check is made on whether there are remaining data points in multidimensional particle analysis data 215 that have not been evaluated.

In step 650, if there are still data points to be evaluated, procedure 600 goes to step 652 to select a successive data point from the remaining data points to be evaluated in multidimensional particle analysis data 215. Procedure 600 then proceeds to step 630. If all data points have been evaluated, procedure 600 terminates.

In one embodiment, the reconstructed multidimensional clusters generated according to procedure 600 can then be mapped to particle populations based on their feature values. In another embodiment, a template can be used to map the reconstructed multidimensional clusters to the corresponding populations. The template can include a set of pre-identified multidimensional clusters. In one embodiment, the reconstructed multidimensional clusters can then be output for display. In another embodiment, the reconstructed multidimensional clusters can be stored on a storage device. In another embodiment, particles in each of the reconstructed multidimensional clusters can be counted and reported or used in subsequent analysis and determination of attributes of the biological sample.

Each reconstructed multidimensional cluster includes data points with a same 2D cluster classification. A further example of reconstructing multidimensional clusters based on 2D projections is described below.

EXAMPLE

Figure 7A:
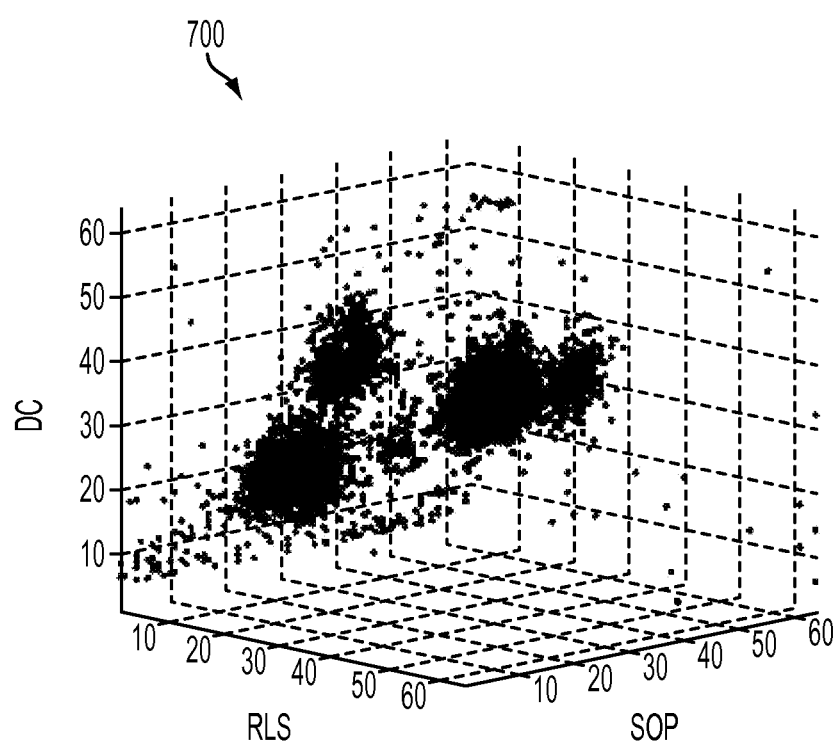
FIG. 7A shows an example of 3D hematology data of a white blood cell normal sample obtained from a Beckman Coulter hematology analyzer.

In one embodiment for hematology data analysis, the multidimensional clusters corresponding to blood cell populations are reconstructed based on 2D histograms of the hematology data. Each 2D histogram of the hematology data is an image where each pixel in the 2D histogram has an intensity value proportional to the corresponding histogram amplitude or cell event density. The hematology data can include measurements related to electro-optical interrogations of the blood sample. FIG. 7A is an example of multidimensional hematology data with three features, DC, RLS, and SOP. SOP is a linear transformation of opacity (OP). SOP is used to better separate the particle populations. The corresponding multidimensional feature space is a three-dimensional (3D) feature space 700 over DC-RLS-SOP. The hematology data in FIG. 7A is obtained using a hematology analyzer from Beckman Coulter Inc. of Miami, Fla. In FIG. 7A, feature space 700 includes a set of data points corresponding to individual cell events. Embodiments of the present invention, can provide a method that identifies multidimensional clusters in feature space 700 automatically and maps them with corresponding particle populations.

The 3D feature space 700 shown in FIG. 7A is defined by:

$$F=\{RLS,DC,SOP\}. \quad (9)$$

According to equation (3), a total number of t=3 2D histograms can be obtained by combining features in F. The three 2D histograms are over RLS-DC, SOP-DC and RLS-DC dimensions, respectively. In this example, RLS-DC, SOP-DC histograms are used to reconstruct multidimensional clusters, because all three features (i.e., DC, RLS, SOP) can be obtained in RLS-DC and SOP-DC histograms. The segmentation of the RLS-SOP histogram is not used in the multidimensional cluster reconstruction.

Figure 7B:
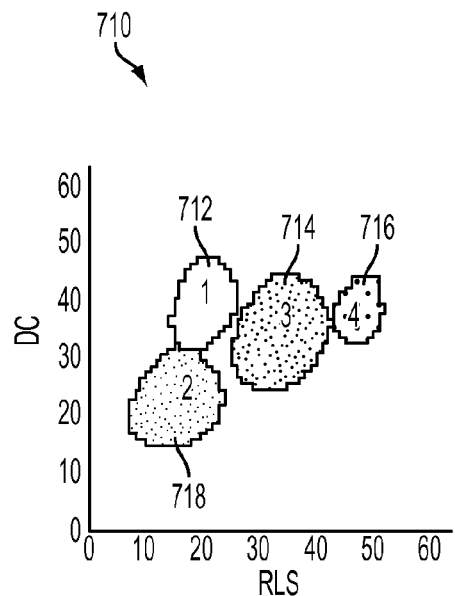
FIGS. 7B and 7C are examples of 2D segmentations in two different 2D histograms drawn from the example hematology data for FIG. 7A according to an embodiment of the present invention.
Figure 7C:
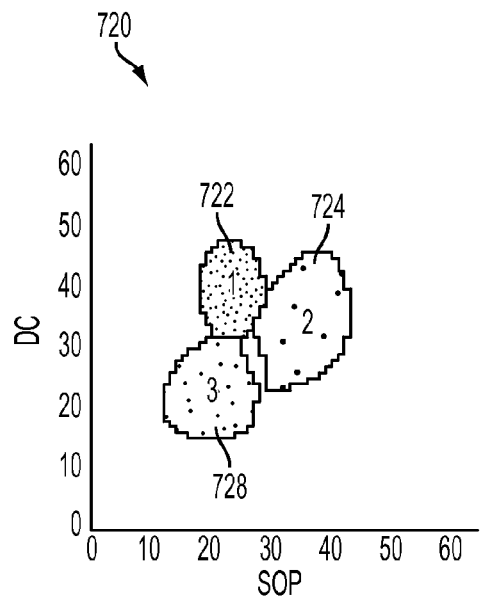

In FIG. 7B, cluster image 710 is obtained by segmenting the histogram RLS-DC. Cluster image 710 contains four 2D clusters. Cluster 1 corresponds to a population 712, cluster 2 corresponds to a population of 718, cluster 3 corresponds to a population 714, and cluster 4 corresponds to a population 716. FIG. 7C is a cluster image 720 obtained by segmenting the SOP-DC histogram.

In FIG. 7C, cluster image 720 includes three 2D clusters. Cluster 1 corresponds to a population 722, cluster 2 corresponds to a population 724, and cluster 3 corresponds to a population 728. In one embodiment, 2D clusters in the cluster images are assigned temporary labels. The 2D clusters are not mapped to particle populations. The multidimensional clusters can be mapped to respective particle populations once they are reconstructed.

The multidimensional clusters are reconstructed based on equation (8). For example, a multidimensional cluster can be reconstructed based on cluster 2 in cluster image 710 and cluster 3 in cluster image 720. The multidimensional cluster is represented by $M_{2,3,1}$. The "2" in $M_{2,3,1}$ corresponds to cluster 2 in cluster image 710. The "3" in $M_{2,3,1}$ corresponds to cluster 3 in cluster image 720. According to equation (8), $M_{2,3,1}$ can be identified by:

$$M_{2,3,1} = \begin{cases} (x_{f_1}, x_{f_2}, x_{f_3}, 1): & \forall (x_{f_1}, x_{f_2}) \in C_{2,f_1 f_2}, \\ & \forall (x_{f_2}, x_{f_3}) \in C_{3,f_2 f_3}, \\ & H(x_{f_1}, x_{f_2}, x_{f_3}) > 2 \end{cases} \quad (10)$$

where $f_1$ is RLS, $f_2$ is DC, and $f_3$ is SOP.

In this example, a threshold of more than 2 events is used to filter noise events in the multidimensional histogram H.

The other multidimensional clusters can be defined similarly.

In some embodiments, a particle population can share similar values of some features with other populations. Accordingly, the cluster corresponding to such particle population can overlap with other clusters in the 2D projections. This cluster can not be detected in some of the cluster images. According to one feature, multidimensional clusters not detected in the 2D projections can be recovered by the multidimensional cluster reconstruction process.

Figure 7D:
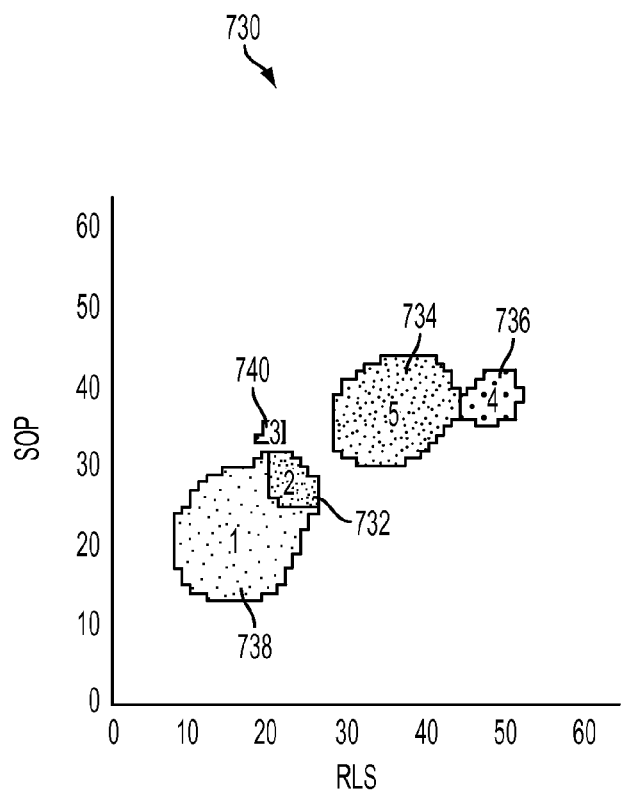
FIG. 7D shows another 2D histogram segmentation drawn from the example hematology data for FIG. 7A according to an embodiment of the present invention.

For example, FIG. 7D shows cluster image 730 obtained by segmenting the 2D histogram over RLS-SOP, which is not used in the multidimensional cluster reconstruction process. In FIG. 7D, cluster 1 corresponds to lymphocytes 738, cluster 2 corresponds to monocytes 732, cluster 3 corresponds to basophils 740, cluster 4 corresponds to eosinophils 736, and cluster 5 corresponds to neutrophils 734. Population of basophils 740 (labeled "3") is not detected in both FIG. 7B and FIG. 7C. This is because basophils are blocked by population 718 in FIG. 7B and by population 724 in FIG. 7C. However, based in equation (8), a multidimensional cluster $M_{2,2,5}$ can be reconstructed by:

$$M_{2,2,5} = \left\{ \begin{array}{ll} (x_{f_1}, x_{f_2}, x_{f_3}, 5): & \forall (x_{f_1}, x_{f_2}) \in C_{2,f_1 f_2}, \\ & \forall (x_{f_2}, x_{f_3}) \in C_{2,f_2 f_3}, \\ & H(x_{f_1}, x_{f_2}, x_{f_3}) > 2 \end{array} \right\} \quad (11)$$

The multidimensional cluster $M_{2,2,5}$ can be identified as basophils by examining the associated feature values. Therefore, the blocked basophils in FIG. 7B and FIG. 7C are recovered by the multidimensional cluster reconstruction process.

After the multidimensional clusters are reconstructed, they can be classified as respective particle populations based on their feature values.

Figure 8:
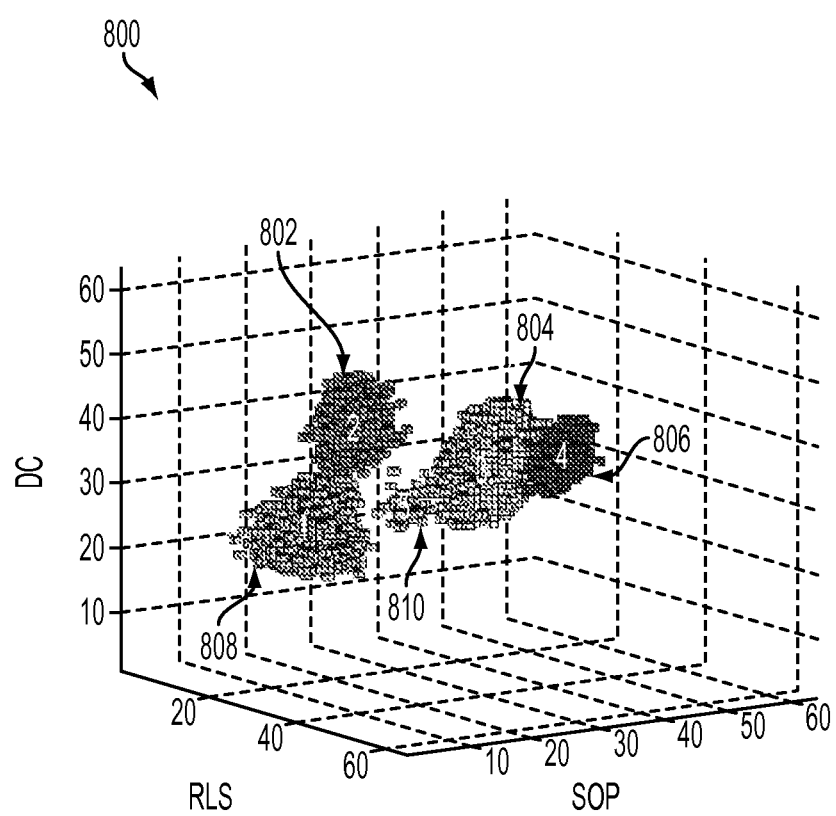
FIG. 8 is an example of reconstructed 3D clusters based on examples in FIGS. 7A-C according to an embodiment of the present invention.

FIG. 8 shows the reconstructed multidimensional clusters in feature space 800 based on the cluster images 710 and 720 shown in FIGS. 7B and 7C. In FIG. 8, feature space 800 contains five multidimensional clusters. Cluster 808 corresponds to lymphocytes and is labeled as "1". Cluster 802 has a label number "2" and designates monocytes. Cluster 802 is reconstructed based on cluster 712 in FIG. 7B and cluster 722 in FIG. 7C. Cluster 804 has a label number "3" and corresponds to neutrophils. Cluster 804 is reconstructed based on cluster 714 in FIG. 7B and cluster 724 in FIG. 7C. Cluster 806 has a label number "4" and corresponds to eosinophils. Cluster 806 is reconstructed based on cluster 716 in FIG. 7B and cluster 724 in FIG. 7C. Cluster 810 has a label number "5" and represents basophils.

The reconstructed multidimensional clusters in FIG. 8 are mapped with corresponding particle populations. In addition, data points in feature space 700 having density values less than two are filtered out during the multidimensional cluster reconstruction. Without such data points, the reconstructed clusters in FIG. 8 can have a more compact representation. By providing a more compact representation, the present invention can improve the visual clarity of the data in that outlier data has been filtered out. Such reconstructing and mapping can provide users a tangible multidimensional particle population classification of the hematology data for better understanding and analysis.

Embodiments of the present invention provide a computationally efficient method for the reconstruction of cluster in the complete feature space taken as input the segmentations obtained from 2D projections. The method can be applied to any number of features or dimensions for a classification process. This method can also help in complex abnormal blood sample analysis.

Exemplary Computer System

Figure 9:
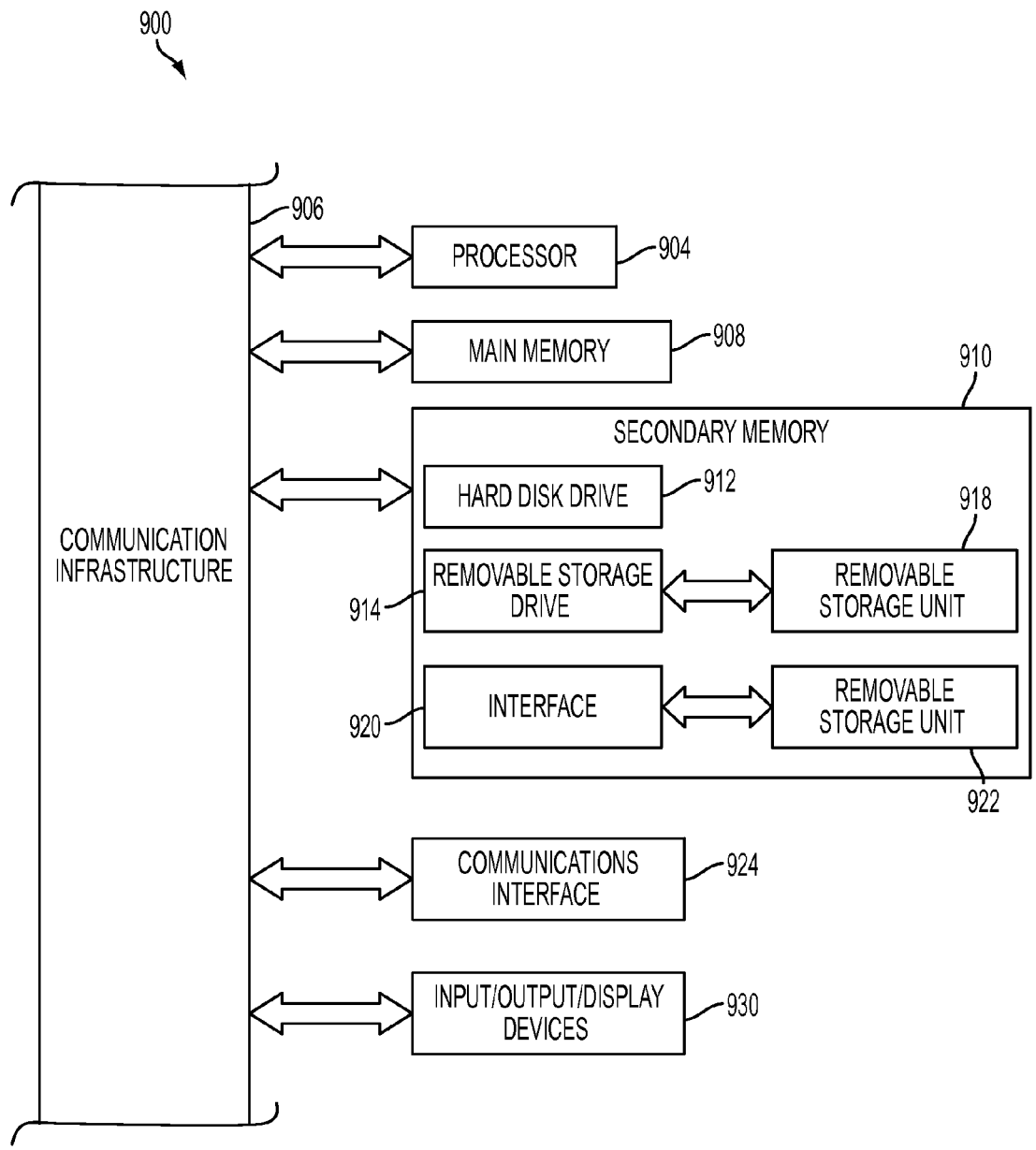
FIG. 9 is a diagram of an exemplary computer system for reconstructing multidimensional particle analysis data clusters according to an embodiment of the invention.

In some embodiments of the present invention, multidimensional cluster generator 220 and its components such as segmentation module 222, 2D cluster classification module 224, and multidimensional cluster reconstruction module 226 can be implemented using hardware, firmware, software or a combination thereof and can be implemented in a computer system or other processing system. In an embodiment, a computer program product can execute on a computing device capable of carrying out the functionality described herein. An example of a computing device, computer system 900, is shown in FIG. 9. Computer system 900 includes one or more processors, such as processor 904. Processor 904 is connected to a communication infrastructure 906 (such as a bus).

Computer system 900 also includes a main memory 908, preferably random access memory (RAM), and can also include a secondary memory 910. Secondary memory 910 can include, for example, a hard disk drive 912 and/or a removable storage drive 914, representing a floppy disk drive, an optical disk drive, etc. Removable storage drive 914 reads from and/or writes to a removable storage unit 918 in a well-known manner. Removable storage unit 918, represents a floppy disk, optical disk, memory card, etc., which is read by and written to by removable storage drive 914. As will be appreciated, the removable storage unit 918 includes a computer usable storage medium having stored therein computer software and/or data.

In alternative embodiments, secondary memory 910 can include other similar means, such as a removable storage unit 922 and an interface 920, for allowing computer programs or other instructions to be loaded into computer system 900. Examples of such can include a program cartridge and cartridge interface (such as that found in video game devices), a removable memory chip (such as an EPROM, or PROM) and associated socket, and other removable storage units and interfaces.

Computer system 900 can also include a communication interface 924. Communication interface 924 enables computer system 900 to communicate with external and/or remote devices. Examples of communications interface 924 can include a modem, a network interface (such as an Ethernet card), a communications port, a PCMCIA slot and card, etc. Computer system 900 receives data and/or computer program products via communication network 924. Software and data can be transferred via communications interface 924.

Computer programs (also called computer control logic) are stored in main memory 908 and/or secondary memory 910. Computer programs can also be received via communications interface 924. Such computer programs, when executed, enable computer system 900 to perform the features of the present invention as discussed herein. In particular, the computer programs, when executed, enable processor 904 to perform the features of embodiments of the present invention. Accordingly, such computer programs represent controllers of computer system 900.

In an embodiment where the invention is implemented using software, the software can be stored in a computer program product and loaded into computer system 900 using removable storage drive 914, hard disk drive 912 or communications interface 924. The control logic (software), when executed by processor 904, causes processor 904 to perform the functions of embodiments of the invention as described herein.

Computer system 900 also includes input/output/display devices 932, such as monitors, keyboards, pointing devices, etc.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention. Furthermore, it should be appreciated that the detailed description of the present invention provided herein, and not the summary and abstract sections, is intended to be used to interpret the claims. The summary and abstract sections can set forth one or more but not all exemplary embodiments of the present invention as contemplated by the inventors. Embodiments can work with software, hardware, and operating system implementations other than those described herein. Any software, hardware, and operating system implementations suitable for performing the functions described herein can be used. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalence.

What is claimed is:

1. A method for reconstructing multidimensional particle analysis data clusters on a computing device, the multidimensional particle analysis data including data for each particle for at least three dimensions, comprising:
    obtaining, on the computing device, a set of segmented two-dimensional projections corresponding to multidimensional particle analysis data associated with a biological sample of particles, each segmented two-dimensional projection in the set being a projection of the same multidimensional particle analysis data as the other two-dimensional projections in the set, each segmented two-dimensional projection in the set being a projection on two dimensions that are a different pair of dimensions than any of the other two-dimensional projections in the set, each segmented two-dimensional projection having a segmentation which divides the data in the two-dimensional projection into one or more two-dimensional clusters each associated with corresponding particle populations in the biological sample; and
    reconstructing, on the computing device, a segmentation of the particle analysis data into one or more multidimensional clusters based on the two-dimensional clusters in at least two different projections in the set of segmented two-dimensional projections, the one or more multidimensional clusters being defined in at least three dimensions.

2. The method of claim 1, wherein the obtaining the set of segmented two-dimensional projections comprises obtaining two or more segmented two-dimensional projections, each segmented two-dimensional projection sharing a single dimension, and only a single dimension, with another segmented two-dimensional projection in the set.

3. The method of claim 2, wherein the dimensions represent measured physical property values of particles.

4. The method of claim 2, wherein the reconstructing one or more multidimensional clusters comprises the following steps implemented on the computing device:
    selecting a data point in the multidimensional particle analysis data;
    determining, for each segmented two-dimensional projection, a respective two-dimensional point corresponding to the selected data point;
    identifying two-dimensional clusters containing the determined two-dimensional points in the two-dimensional projections; and
    associating the selected data point with a multidimensional cluster based on the identified two-dimensional clusters.

5. The method of claim 4, wherein the associating the selected data point with a multidimensional cluster comprises associating the selected data point with a multidimensional cluster containing data points corresponding to the same two-dimensional cluster identification.

6. The method of claim 4, wherein the selecting a data point comprises selecting a data point having a value above a threshold.

7. The method of claim 1, wherein the obtaining a set of segmented two-dimensional projections corresponding to multidimensional particle analysis data comprises obtaining a set of segmented two-dimensional projections corresponding to particle analysis data including measurements of at least three parameters selected from the following group of parameters: direct current, volume, radio frequency, opacity, one or more types of light scatter, axial light loss, and fluorescence.

8. The method of claim 1, wherein the obtaining a set of segmented two-dimensional projections corresponding to multidimensional particle analysis data comprises obtaining a set of segmented two-dimensional histograms corresponding to the multidimensional particle analysis data.

9. The method of claim 1, wherein the obtaining a set of segmented two-dimensional projections corresponding to multidimensional particle analysis data comprises obtaining a set of segmented two-dimensional scattergrams corresponding to the multidimensional particle analysis data.

10. The method of claim 1, further comprising displaying the reconstructed multidimensional clusters on a display.

11. The method of claim 1, further comprising storing the reconstructed multidimensional clusters on a storage device.

12. The method of claim 1, further comprising counting particles in each of the reconstructed multidimensional clusters.

13. The method of claim 1, further comprising:
    identifying cross-relations between two-dimensional clusters in at least two different two-dimensional projections,
    wherein the reconstructing the one or more multidimensional clusters is based on the identified cross-relations between the two-dimensional clusters.

14. The method of claim 13, using the cross-relations to identify clusters in different two-dimensional projections that correspond to the same particle populations in the biological sample.

15. The method of claim 13, further comprising:
    using the cross relations to identify a particle population in a two-dimensional projection to identify a population of particles in a two-dimensional projection that was not identified by two-dimensional clustering the data in the two-dimensional projection without the cross relations.

16. A computer-implemented system for reconstructing multidimensional particle analysis data clusters, the multidimensional particle analysis data including data for each particle for at least three dimensions, comprising on at least one computing device:
    a two-dimensional segmentation module that obtains a set of two-dimensional projections of multidimensional particle analysis data associated with a biological sample of particles, each two-dimensional projection in the set being a projection of the same multidimensional particle analysis data as the other two-dimensional projections in the set, each two-dimensional projection in the set being a projection on two dimensions that are a different pair of dimensions than any of the other two-dimensional projections in the set, and segments each of the two-dimensional projections into one or more two-dimensional clusters, wherein each two-dimensional cluster corresponds to a particle population in the biological sample;
    a two-dimensional cluster classification module that, for each multidimensional data point in the multidimensional particle analysis data that has a value above a pre-specified threshold, identifies two-dimensional clusters in the two-dimensional projections that contain the multidimensional data point; and a multidimensional cluster reconstruction module that groups multidimensional data points based on the identified two-dimensional clusters in at least two different projections in the set of two-dimensional projections to reconstruct one or more multidimensional clusters, where the multidimensional clusters are defined in at least three different dimensions.

17. The system of claim 16, further comprising a hematology analyzer that interrogates particles in a biological sample to obtain the multidimensional particle analysis data, and outputs the multidimensional particle analysis data to the two-dimensional segmentation module.

18. The system of claim 16, wherein the two-dimensional projections are two-dimensional histograms.

19. The system of claim 16, wherein the two-dimensional projections are two-dimensional scattergrams.

20. The method of claim 16, wherein the dimensions represent measured physical property values of particles.

21. A method for reconstructing multidimensional particle analysis data clusters, comprising:
(a) passing particles from a biological sample through a measuring region of a particle analyzer;
(b) interrogating each particle passing through the measuring region with at least three parameters;
(c) detecting the at least three parameters with one or more detectors;
(d) storing the detected at least three parameters as multidimensional particle analysis data having at least three dimensions, each dimension corresponding to one of the detected parameters;
(e) generating a set of two-dimensional projections corresponding to the multidimensional particle analysis data, each two-dimensional projection in the set being a projection of the same multidimensional particle analysis data as the other two-dimensional projections in the set, each two-dimensional projection in the set having a different pair of dimensions than the other two-dimensional projections in the set;
(f) segmenting the two-dimensional projections in the set into two-dimensional clusters associated with particle populations in the biological sample; and
(g) reconstructing a segmentation of the particle analysis data into one or more multidimensional clusters based on the segmented two-dimensional clusters in at least two different two-dimensional projections in the set of two-dimensional projections, where the multidimensional clusters are defined in at least three different dimensions.

22. The method of claim 21, further comprising displaying the reconstructed multidimensional clusters on a display.

23. The method of claim 21, further comprising storing the reconstructed multidimensional clusters on a storage device.

24. The method of claim 21, further comprising counting particles in each of the reconstructed multidimensional clusters.

25. The method of claim 21, wherein the at least three parameters comprises at least three parameters selected from the following group of parameters: direct current, volume, radio frequency, opacity, one or more types of light scatter, axial light loss, and fluorescence.

26. The method of claim 21, further comprising:
identifying cross-relations between two-dimensional clusters in at least two different two-dimensional projections,
wherein the reconstructing the one or more multidimensional clusters is based on the identified cross-relations between the two-dimensional clusters.

27. The method of claim 26, using the cross-relations to identify clusters in different two-dimensional projections that correspond to the same particle populations in the biological sample.

28. The method of claim 26, further comprising:
using the cross relations to identify a particle population in a two-dimensional projection to identify a population of particles in a two-dimensional projection that was not identified by two-dimensional clustering the data in the two-dimensional projection without the cross relations.

29. A system for reconstructing multidimensional particle analysis data clusters, comprising:
a particle analyzer that includes:
a preparation system for preparing a biological sample containing a plurality of particles for analysis;
a transducer module having a measuring region, a plurality of interrogation sources to interrogate at least one of the particles passing through the measuring region, and at least one detector to detect a plurality of parameters associated with at least one of the particles; and
a memory that stores the detected parameters as multidimensional particle analysis data, the multidimensional particle analysis data having at least three dimensions, each dimension corresponding to one of the detected parameters;
a two-dimensional cluster classification module that receives a set of two-dimensional projections of the multidimensional particle analysis data, each two-dimensional projection in the set being a projection of the same multidimensional particle analysis data as the other two-dimensional projections in the set, each two-dimensional projection in the set having a different pair of dimensions than the other projections in the set, and for each multidimensional data point in the multidimensional particle analysis data that has a value above a pre-specified threshold, identifies two-dimensional clusters in the two-dimensional projections that contain the multidimensional data point;
a two-dimensional segmentation module that segments the two-dimensional projections into two-dimensional clusters, wherein each two-dimensional cluster corresponds to a particle population in the biological sample; and
a multidimensional cluster reconstruction module that groups multidimensional data points based on the identified two-dimensional clusters in at least two different two-dimensional projections in the set of two-dimensional projections to reconstruct one or more multidimensional clusters, the multidimensional clusters being defined in at least three dimensions.

30. The system of claim 29, wherein the multidimensional cluster reconstruction module is further configured to identify a population of particles in one of the two-dimensional projections that was not identified by segmenting the data in the one of two-dimensional projections into two-dimensional clusters.

* * * * *